(12) United States Patent
Saenger

(10) Patent No.: US 7,868,297 B2
(45) Date of Patent: Jan. 11, 2011

(54) COVERING OF SCINTILLATION DETECTOR WITH A REFLECTIVE COATING

(75) Inventor: Richard Saenger, Chatillon (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/243,575

(22) Filed: Oct. 5, 2005

(65) Prior Publication Data

US 2006/0091312 A1    May 4, 2006

(30) Foreign Application Priority Data

Oct. 8, 2004    (EP)    ................................. 04292400

(51) Int. Cl.
*G01T 1/20*    (2006.01)
(52) U.S. Cl. .................................. 250/361 R
(58) Field of Classification Search ............ 250/361 R, 250/253, 256, 261, 368
See application file for complete search history.

(56) References Cited

U.S. PATENT DOCUMENTS

| | | | | |
|---|---|---|---|---|
| 3,950,647 | A * | 4/1976 | Piltingsrud | 250/361 R |
| 4,053,767 | A * | 10/1977 | Kampfer et al. | 250/252.1 |
| 4,543,485 | A * | 9/1985 | Ishii et al. | 250/487.1 |
| 4,658,141 | A | 4/1987 | Toth et al. | |
| 5,773,829 | A * | 6/1998 | Iwanczyk et al. | 250/367 |
| 5,869,836 | A | 2/1999 | Linden et al. | |
| 6,298,113 | B1 | 10/2001 | Morse et al. | |
| 2003/0146387 | A1 * | 8/2003 | Sakai | 250/361 R |
| 2003/0209671 | A1 * | 11/2003 | Frederick et al. | 250/363.01 |
| 2004/0232342 | A1 * | 11/2004 | Aykac et al. | 250/367 |
| 2004/0262527 | A1 * | 12/2004 | Ooi | 250/368 |

* cited by examiner

*Primary Examiner*—David P Porta
*Assistant Examiner*—Marcus H Taningco
(74) *Attorney, Agent, or Firm*—Matthias Abrell

(57) ABSTRACT

The present invention discloses a scintillation detector 10 comprising a scintillation crystal 12 covered by an inner coating layer 14, said inner coating layer 14 being reflective to light spectrum, and said inner coating layer 14 being stuck directly to said crystal by a chemical and/or a physical binding. According to further aspect of the invention, a method is disclosed to measure radiation from an wellbore environment with the aforementioned scintillation detector 10. According to a still further aspect of the invention, a method is disclosed to manufacture a scintillation detector 10, comprising the steps of: defining two surface parts in a scintillation crystal 12: first and second part, covering said first part of said scintillation crystal 12 with an inner coating layer 14, said inner coating layer 14 being reflective to light spectrum and said inner coating layer 14 being stuck directly to said crystal 12 by a chemical and/or a physical binding, leaving said second part without coating, positioning said scintillation crystal 12 and said inner coating layer 14 in a shock absorbing member 18, positioning said second part in front of an optical window 24 transmissive to scintillation light given by said scintillation crystal 12, positioning said shock absorbing member 18 and said optical window 24 in a protective housing 20.

17 Claims, 1 Drawing Sheet

COVERING OF SCINTILLATION DETECTOR WITH A REFLECTIVE COATING

CROSS REFERENCE TO RELATED APPLICATIONS

This application claims priority to European patent application 0429400.1 filed Oct. 8, 2004.

FIELD OF THE INVENTION

This present invention relates generally to a scintillation detector and method for performing radiation-based measurements, and to a method of manufacturing a scintillation detector. The scintillation detector and method are particularly useful for borehole logging applications.

DESCRIPTION OF THE PRIOR ART

Scintillation detectors have been employed in the oil and gas industry for well logging. These detectors have used thallium activated sodium iodide crystals that are effective in detecting gamma ray radiations. The crystals are enclosed in tubes or casings to form a crystal package. The crystal package has an optical window at one end of the casing, which permits scintillation light induced by radiation to pass out of the crystal package for measurement by a light sensing device such as a photomultiplier tube coupled to the crystal package. The photomultiplier tube converts the light photons emitted from the crystal into electrical pulses that are shaped and digitized by associated electronics. Therefore, the fraction of the induced scintillation light collected by the photomultiplier should be as large as possible. One reason, which leads to reduce this fraction of light, is the losses at the crystal surface. The uniformity of light collection depends primarily on the conditions, which exist at the interface between the crystal and the enclosing tube. In order to recapture the light that escapes from the surface, the crystal is normally surrounded by a reflector at all surfaces except that at which the photomultiplier tube is mounted. Two types of reflector can be used: a polished metallic surface acting as a specular reflector or a dry powder packed around surfaces of the crystal acting as a diffuse reflector.

The ability to detect gamma rays makes it possible to analyze rock strata surrounding the borehole, as by measuring the gamma rays coming from naturally occurring radioisotopes in downhole shales which bound hydrocarbon reservoirs. A common practice is to make those measurements while drilling (MWD); and for this type of application, the detector must be capable of withstanding high temperatures and also must have high shock resistance. At the same time, there is a need to maintain performance specifications.

A problem associated with MWD applications is that the reflector used in the detector, specular or diffuse, will suffer from those high temperatures and high shocks. When a diffuse reflector as a dry aluminum powder is used, after some shocks it will clog at one end of the crystal package and fail to reflect light at all surfaces. And when a specular reflector as polytetrafluoroethene (PTFE) tape, or any type of foil is used, the inhomogeneities of the crystal edge do not ensure a perfect contact between the crystal and the foil. Air and gas are irremediably trapped in the crystal/foil interface and it does not permit to the foil to act as a perfect specular reflector, reducing a large fraction of light induced by the crystal.

Another problem associated with MWD applications, is that detectors report a higher than an actual count rate if the scintillation crystal package produces vibration induced light pulses. The harsh shock and vibration conditions the detectors encounter during drilling can cause a crystal package to emit spurious light pulses in addition to gamma ray induced light pulses. That is, the detector output will be composed of radiation induced counts and vibration induced counts. Heretofore, the detector electronics could not distinguish the vibration induced counts from the genuine gamma counts, whereby the detector reports a higher than actual count rate. Some prior art solutions use electronic devices to filter out vibration induced counts by discriminating on the basis of the pulse shape and/or the signal decay time. Other solutions, directly applied to the package of the crystal, described in U.S. Pat. No. 5,869,836, use an elastomeric material which absorbs shocks and vibration. Commonly, this elastomeric material is associated with a PTFE tape to act as a reflector. This shock absorbing member solves the problem related to high temperatures and high shock resistance, but not to the problem of specular reflector. The present invention provides a solution to the aforesaid problem of reflector in the crystal package.

SUMMARY OF THE INVENTION

The present invention discloses a scintillation detector comprising a scintillation crystal covered by an inner coating layer, this inner coating being reflective to light spectrum and being stuck directly to the crystal by a chemical and/or a physical binding.

In a preferred embodiment, the chemical binding is realized by a chemical vapor deposition process, called CVD. The CVD ensure an excellent adhesion to the crystal and a uniform thickness, even in deep holes and recesses.

In another preferred embodiment, the physical binding is realized by a physical vapor deposition process, called PVD. The PVD does not affect the dimensions and geometry of the crystal while ensuring a good adhesion to the crystal and, a uniform and homogenous layer. The uniformity, the composition and the structure of the coating layer can be optimized and parameterized separately. Preferably, the PVD will be done by sputtering.

Preferably, the inner coating is thermally conductive. The thermal conductivity ensures a good heat transfer inside the crystal, so that the temperature on the coating layer and crystal interface is homogenous, and also inside the crystal.

Preferably, the inner coating is electrically conductive. The electrical conductivity of the coating layer avoids the triboelectric effect.

In a preferred embodiment, the crystal is a sodium iodide crystal activated with thallium NaI(Tl) and the inner coating is done with a metal such as aluminum. The emission spectrum of NaI(Tl) presents a peak at 410 nm and aluminum presents perfectly good reflection properties in this UV region of the light spectrum.

In a preferred embodiment of the invention, the scintillation detector further comprises an outer coating layer, this outer coating layer being stuck directly to the inner coating layer by a chemical and/or a physical binding. The outer coating layer can cover all the surface of the inner coating layer or a partial one's. The process used to create the physical and/or chemical binding is the same as for the inner coating layer. In a preferred embodiment the outer coating is done with a metal such as platinum or gold. The second coating layer will enhance the reflection properties of the first coating layer.

In a preferred embodiment, the scintillation detector further comprises a shock absorbing member covering the inner coating layer or the outer coating layer if present. The shock absorbing member is made of an elastomeric material which protects scintillation crystal against shock and vibrations.

According to a further aspect, the invention discloses a method of measuring radiation from an environment including the steps of:

positioning in the environment, a scintillation detector comprising a scintillation crystal covered by an inner coating layer, this inner coating layer being reflective to light spectrum and being stuck directly to the crystal by a chemical and/or a physical binding, receiving emitted photons from the scintillation crystal with a light sensing device, converting the emitted photons into electrical signals, wherein the electrical signals substantially represent the radiation being measured.

In a preferred embodiment, the light sensing device is a photomultiplier.

According to a still further aspect, the invention discloses a method of manufacturing a scintillation detector, comprising the steps of:

defining two surface parts in a scintillation crystal: first and second part, covering said first part of said scintillation crystal with an inner coating layer, said inner coating layer being reflective to light spectrum and said inner coating layer being stuck directly to said crystal by a chemical and/or a physical binding, leaving said second part without coating, positioning said scintillation crystal and said inner coating layer in a shock absorbing member, positioning said second part in front of an optical window transmissive to scintillation light given by said scintillation crystal, positioning said shock absorbing member and said optical window in a protective housing.

Preferably, the method of manufacturing a scintillation detector, further comprises the step of covering said inner coating layer with an outer coating layer, said outer coating layer being stuck directly to said inner coating layer by a chemical and/or a physical binding.

In a preferred embodiment, the chemical binding is realized by CVD and/or the physical binding is realized by PVD.

Preferably, the inner and/or outer coating layer is thermally conductive and/or is electrically conductive.

Preferably, the inner and/or the outer coating layer are layers made of metal. When a sodium iodide crystal activated with thallium is used as scintillation crystal: the inner metal layer is aluminum and the outer metal layer is platinum or gold.

DETAILED DESCRIPTION OF THE INVENTION

Figure 1:
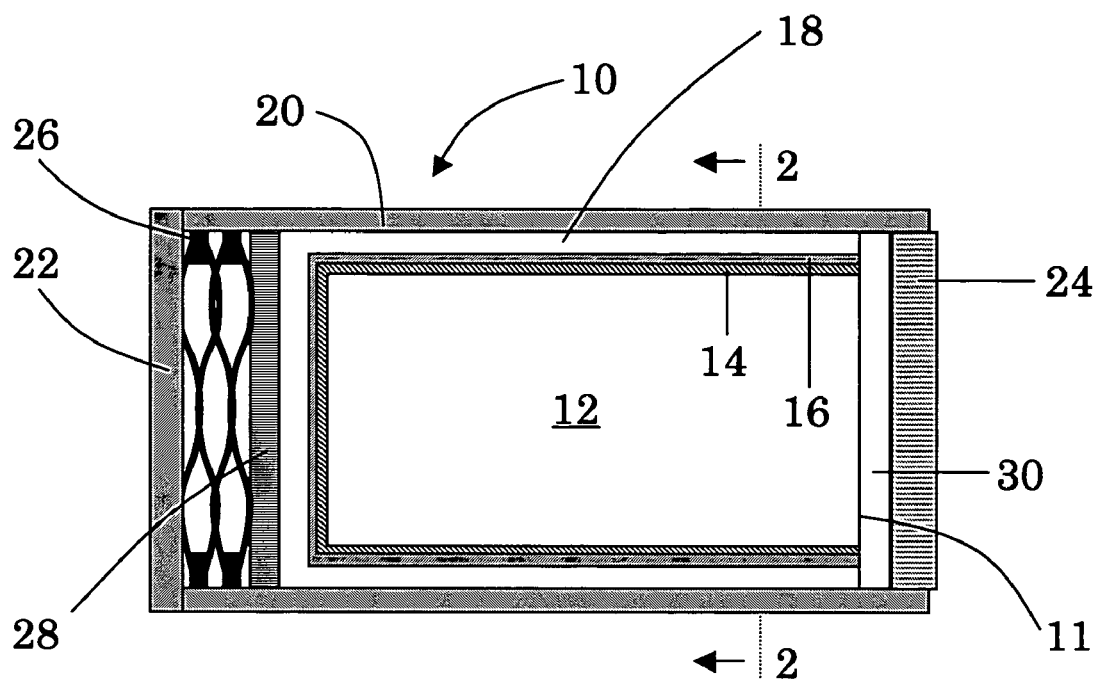
FIG. 1 is a view of a scintillation crystal package in accordance with the invention.
Figure 2:
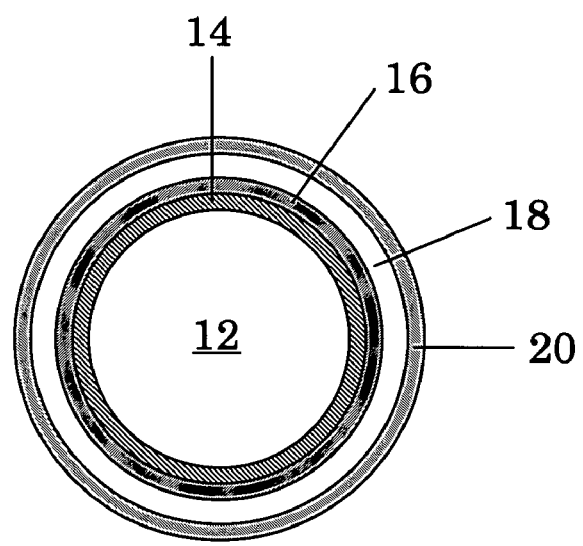
FIG. 2 is a cross-sectional view of the scintillation crystal package taken along the line 2-2 of FIG. 1.

Referring now in detail to the drawings, FIGS. 1 and 2 illustrate an exemplary and preferred scintillation crystal package 10 according to the present invention. Package 10 comprises of a scintillation crystal 12, which is covered with an inner primary coating layer 14, this primary coating layer 14 covering all the surface of the crystal except the front-end face 11 of the crystal. In the illustrated preferred embodiment, the scintillation crystal 12 has the shape of a right cylinder. It is contemplated that the invention may have application to crystals of other shapes and the layers may be applied to a crystal surface other than a cylindrical surface. Scintillation crystal 12 is a sodium iodide crystal activated with thallium NaI(Tl). NaI(Tl) is an excellent light yield to primary or secondary electrons; because its response to electrons and gamma rays is close to linear over most of the significant energy range. The primary coating layer 14 is made of aluminum; because the emission spectrum of NaI(Tl) presents a peak at 410 nm and aluminum presents perfectly good reflection properties in this UV region of the light spectrum. The thickness of the coating layer 14 is of some microns, preferably 1 to 4 microns.

The primary coating layer 14 has also a good thermal conductivity. The thermal conductivity ensures a good heat transfer inside the crystal, so that the temperature on the coating layer and crystal interface is homogenous, and also inside the crystal. This good thermal conductivity avoids transient temperature distribution, which brings about transient decay time in induced crystal's fluorescence. To ensure a good time resolution of the scintillation detector, this decay time must be kept homogenous inside the crystal. For NaI(Tl) dominant decay time of the scintillation pulse is 230 ns at 20° C. When temperature is higher, the decay time decreases.

The primary coating layer 14 has also a good electrical conductivity. The electrical conductivity of the coating layer avoids the triboelectric effect. Effectively, when a specular reflector as polytetrafluoroethene directly circumscribes the crystal, shocks and temperature variations generate friction at the interface polytetrafluoroethene/crystal, which leads to electrically charging the polytetrafluoroethene and the crystal. When discharging, induced scintillation light will be created inside the crystal. That is, the detector output will be composed of the triboelectric induced counts. And heretofore, the detector electronics could not distinguish the triboelectric induced counts from the genuine gamma counts, whereby the detector reports a higher than actual count rate. When a conductive coating layer is used no triboelectricity can be generated.

In the illustrated preferred embodiment, the primary coating layer 14 is covered by an outer second coating layer 16. In the preferred embodiment, this second coating layer 16 covers all the surface of the primary coating layer 14. The second coating layer 16 is made of platinum, because of its good reflective properties and non-corrosive properties versus aluminum. The thickness of the second coating layer 16 is of some microns, preferably 1 to 3 microns. The second coating layer will enhance the reflection properties of the first coating layer. Some of the induced scintillation light in the crystal may be attenuated and will have undergone multiple reflections, losing each time a fraction of the output light. The second coating layer will reflect photons that were lost after the first coating layer. In the preferred embodiment, the second coating layer 16 is made of a material further having good thermal conductivity and good electrical conductivity to maintain advantages already explained for primary coating layer.

In the preferred embodiment represented in FIGS. 1 and 2, the crystal 12 and the two coating layers (14, 16) are surrounded by a shock absorbing boot 18, which in turn is surrounded by a casing 20. The shock absorbing boot 18 is made so that the crystal 12 is loaded within a housing, which provides sufficient stiffness such that the operational dynamic bandwidth of the detector application falls below the resonant frequency of vibration induced counts. Therefore, within that environment, vibration induced counts will either not occur or will have a magnitude that falls below an amplitude threshold and will be ignored. The shock absorbing boot 18 is finally and preferably constrained in the casing 20 to ensure hermetic contact from environment. Because, NaI(Tl) is hygroscopic and will deteriorate due to water absorption when exposed to the atmosphere, the crystal 12 must therefore be constrained in an air-tight container from exposure to the surrounding environment. The casing 20 is closed at its rear end by a back cap 22 and at its front end by an optical window 24. The optical window 24 should be made of a material transmissive to scintillation light given off by the scintillation crystal 12, as for example crown glass. The casing 20 and back cap 22 are made preferably of stainless steel or aluminum, as is conventional. The back cap 22 and optical window 24 have sandwiched therebetween, going from left to right in FIG. 1, a spring 26, a packing plate 28, the boot 18, the crystal 12 and the two coating layers (14, 16) and an interface pad 30. The spring 26, or other suitable resilient biasing means, functions to axially load the crystal and press it towards the optical window 24. The spring 26 is a stack of wave springs disposed crest-to-crest. The spring 26 resiliently pushes the crystal 12 towards the optical window 24 to maintain an optical coupling between the front-end face 11 of the crystal 12 and the interface of the optical window 24, thanks to the interface pad 30. The interface pad 30 is made of a suitable optical coupling material such as a transparent silicone elastomer pad sandwiched between the crystal 12 and the optical window 24. As shown, the boot 18 occupies the space between the packing plate 28, the casing 20, the interface pad 30 and the crystal 12 and the two coating layers (14, 16). The boot 18 is preferably cylindrical and concentric with the crystal 12 and the casing 20. The boot 18 is made of resiliently compressible material and preferably is a silicone rubber, elastomer, or silicone elastomer. The silicone elastomer does not include preferably any fillers such as reflecting material powder that may degrade performance.

In another embodiment of the invention not shown on the Figures, the inner or outer coating layer can further comprise miniaturized and low-power electronics such as:
- a temperature sensor to measure the temperature in the inner or outer coating layer and therefore in the crystal,
- a heating or a cooling device to control the temperature of the crystal,
- a diode or a piezoelectric generator to emit quantities of light at regular period; quantities of light that can be analyzed after the photomultiplier by further electronics to calibrate the scintillation crystal (time decay for example).

In accordance with another aspect of the invention, a method is disclosed to measure radiation in a borehole environment using the aforementioned scintillation detector 10. A well logging tool, including a downhole sonde is suspended in a borehole by a cable. The cable connects the downhole sonde to surface equipment, including power supply, surface electronics and post processing associated peripherals. The downhole sonde is positioned close to the environment to be measured. The scintillation detector 10 receives the natural gamma radiation or scattered gamma rays and induces scintillation photons. A light sensing device, such as a photomultiplier, receives emitted photons and converts the emitted photons into electrical signals. The electrical signals, after being processed, substantially represent the radiation being measured.

In accordance still with another aspect of the invention, a method is disclosed to manufacture the aforementioned scintillation detector 10. A coating is performed onto a part of the surface of the NaI(Tl) crystal; and two types of process can be used: one by chemical vapor deposition (CVD) and second by physical vapor deposition (PVD).

When the CVD process is used a chemical binding is realized between the crystal and the coating. The chemical vapor deposition is a successive chain of chemical reactions, which transform gaseous molecules, called precursor, into a solid material, in the form of thin film or powder, on the surface of the crystal. During deposition, a thin film growths on the surface of NaI(Tl) crystal. The CVD ensures an excellent adhesion to the crystal and a uniform thickness, even in deep holes and recesses. The front-end face 11 of the crystal, which will be not coated, is masked during the deposition with a resin or a mask holder.

When the PVD process is used a physical binding occurs between the crystal and the coating. The physical vapor deposition consists in vaporizing a solid material within a vacuum chamber and to migrate these vaporized particles onto the crystal to form a thin film. Different types of PVD are known depending on the driving force, which migrates to the vaporized particles. In a preferred embodiment, the PVD will be done by sputtering. The solid material is vaporized from an anode and will migrate to a cathode thanks to an electric beam. The crystal will be positioned between anode and cathode and a thin layer will be formed when vaporized particles will impact on the crystal. The PVD, because the temperature of the process is much lower compared to CVD (500° C. compared to 1000° C.), does not affect the dimensions and geometry of the crystal while ensuring a good adhesion to the crystal and a uniform and homogenous layer. For the preferred embodiment represented on FIGS. 1 and 2, an aluminum thin film of 3 µm will growth on the surface of NaI(Tl) crystal at a speed of approximately 1 µm per hour. The front-end face 11 of the crystal, which will not be coated, is masked during the PVD with a resin or a mask holder. The operation is repeated after primary coating with another coated material: a platinum thin film of 3 µm is coated on the surface of the primary coating layer. The front-end face 11 of the crystal, which is still not coated, is masked with a resin or a mask holder. With the PVD process, the uniformity, the composition and the structure of the coating layer can be optimized and parameterized separately.

For the preferred embodiment represented on FIGS. 1 and 2, the coated crystal is positioned in the shock absorbing boot 18 and the boot is finally compressed in a protective casing 20. The casing 20 provides a window 24 and an optical coupling 30 between the scintillation crystal and the up coming photomultiplier tube.

In accordance with another aspect of the invention, other types of geometric layer can be performed when the PVD is done by sputtering. As for semiconductor engraving, it is possible thanks to predefined masks to coat all types of shape in two dimensions: a mask will define the part that will be not coated. To perform shape in three dimensions, two dimensions shapes are build level per level with different masks to finally perform a three dimensional model.

In a preferred embodiment, the outer coating layer has the shape of a coil and is electrically conductive, creating a solenoid directly stuck to the crystal surface. This coil will be engraved near the front optical window and can create a magnetic field when a current circulates in the coil. This magnetic field ensures continuity with the magnetic field created by the photomultiplier tube, so that at the entrance of the photomultiplier tube, the total magnetic field induced is maximum.

The invention claimed is:
1. A scintillation detector (10) comprising:
   a scintillation crystal (12) comprised of a sodium iodide crystal activated with thallium, and covered by an inner coating layer (14) reflective to light spectrum, and
   an outer coating layer (16) comprised of platinum or gold;

wherein said inner coating layer (14) being stuck directly to said outer coating layer (16) by a chemical and/or physical vapor deposition process for ensuring a perfect contact with inhomogeneities on the scintillation crystal (12), and wherein the inner coating layer (14) is grown on a surface of the scintillation crystal (12) for ensuring a uniform thickness of said inner coating layer (14).

2. The scintillation detector as in claim 1, wherein the inner (14) and/or the outer (16) coating layer are thermally conductive.

3. The scintillation detector as in claim 1, wherein the inner (14) and/or the outer (16) coating layer are electrically conductive.

4. The scintillation detector as in claim 3, wherein the scintillation detector further comprising a shock absorbing member (18) covering said electrically conductive inner coating layer for avoiding a triboelectric effect.

5. The scintillation detector as in claim 4, wherein the shock absorbing member (18) is made of an elastomeric material.

6. The scintillation detector as in claim 1, wherein the inner (14) and/or the outer (16) coating layer are layers made of metal.

7. The scintillation detector as in claim 1, wherein the inner coating layer (14) is aluminum.

8. A method of measuring radiation from an environment, including the steps of:
  positioning in said environment, the scintillation detector (10) as claimed in claim 1,
  receiving emitted photons from said scintillation crystal (12) with a light sensing device,
  converting the emitted photons into electrical signals, wherein the electrical signals substantially represent the radiation being measured.

9. The method as in claim 8, wherein the light sensing device is a photomultiplier.

10. A method of manufacturing a scintillation detector (10), comprising the steps of:
  defining two surface parts in a scintillation crystal (12): a first and a second part, wherein the scintillation crystal (12) is comprised of a sodium iodide crystal activated with thallium,
  covering said first part of said scintillation crystal (12) with an inner coating layer (14) reflective to light spectrum and electrically conductive,
  covering said inner coating layer (14) with an outer coating layer (16) comprised of platinum or gold, said outer coating layer (16) being stuck directly to said inner coating layer (14) by a chemical and/or a physical vapor deposition process for ensuring a perfect contact with inhomogeneities on the crystal and wherein said inner coating layer (14) is grown on a surface of the crystal for ensuring a uniform thickness of said inner coating layer (14), leaving said second part without coating,
  positioning said scintillation crystal (12) and said electrically conductive inner coating layer (14) in a shock absorbing member (18) for avoiding a triboelectric effect,
  positioning said second part in front of an optical window (24) transmissive to scintillation light given by said scintillation crystal (12),
  positioning said shock absorbing member (18) and said optical window (24) in a protective housing (20).

11. The method as in claim 10, wherein the chemical binding is realized by a chemical vapor deposition process.

12. The method as in claim 10, wherein the physical binding is realized by a physical vapor deposition process.

13. The method as in claim 10, wherein the inner and/or the outer coating layer are thermally conductive.

14. The method as in claim 10, wherein the inner and/or the outer coating layer are electrically conductive.

15. The method as in claim 10, wherein the inner and/or the outer coating layer are layers made of metal.

16. The method as in claim 10, wherein the inner coating layer is aluminum.

17. A scintillation detector (10) comprising a scintillation crystal (12) covered by an inner coating layer (14), said inner coating layer (14) being reflective to light spectrum, and said inner coating layer (14) being stuck directly to said scintillation crystal (12) by a chemical and/or a physical binding, and further comprising an outer coating layer (16), said outer coating layer (16) being stuck directly to said inner coating layer (14), wherein said outer coating layer (16) is platinum or gold.

* * * * *